US006826188B2

(12) United States Patent
Lo et al.

(10) Patent No.: US 6,826,188 B2
(45) Date of Patent: Nov. 30, 2004

(54) METHOD AND CIRCUIT FOR FORMING AN ATM CELL

(75) Inventors: Man Kuk Lo, Fanling (HK); Alick Einav, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 703 days.

(21) Appl. No.: 09/764,967

(22) Filed: Jan. 16, 2001

(65) Prior Publication Data

US 2002/0093962 A1 Jul. 18, 2002

(51) Int. Cl.[7] .............................. H04L 12/28; H04J 3/16
(52) U.S. Cl. .............................. 370/395.6; 370/395.64; 370/466; 709/318
(58) Field of Search ................................. 370/230, 392, 370/395.6, 395.1, 395.64, 466; 709/318

(56) References Cited

U.S. PATENT DOCUMENTS 6,597,697 B1 * 7/2003 Petersen ................ 370/395.64
6,621,821 B1 * 9/2003 Song ........................ 370/395.6
6,711,126 B1 * 3/2004 Besset-Bathias ............ 370/229

FOREIGN PATENT DOCUMENTS

EP      0 994 604 A2 A3      4/2000

OTHER PUBLICATIONS

Chung et al., "Performance Evaluation of an AAL2 Link Transmission Scheme for Voice and Data Packets in BS–BSC Links," IEEE, XP010524308, 2000, pp. 1610–1614.
Isnard et al., "Handling Traffic Classes at AAL2/ATM Layer over the Logical Interfaces of the UMTS Terrestrial Radio Access Network," IEEE, XP010520874, 2000, pp. 1464–1468.
Liu et al., "Packing Density of Voice Trunking Using AAL2," *Global Telecommunications Conference—Globecom '99*, 1999, pp. 611–615.

* cited by examiner

*Primary Examiner*—Duc Ho

(57) ABSTRACT

A method of forming an ATM cell having a fixed length from CPS packets according to the AAL2 protocol includes the steps of placing a header at a beginning of the ATM cell and then packing the ATM cell with the payload of the CPS packets. ATM cells are formed until the payload of the last CPS packet has been packed into an ATM cell. A TimerCU is not triggered until the last available CPS packet has been processed. If the last ATM cell formed is not full, it is padded until it is full.

10 Claims, 3 Drawing Sheets

-PRIOR ART-

-PRIOR ART-

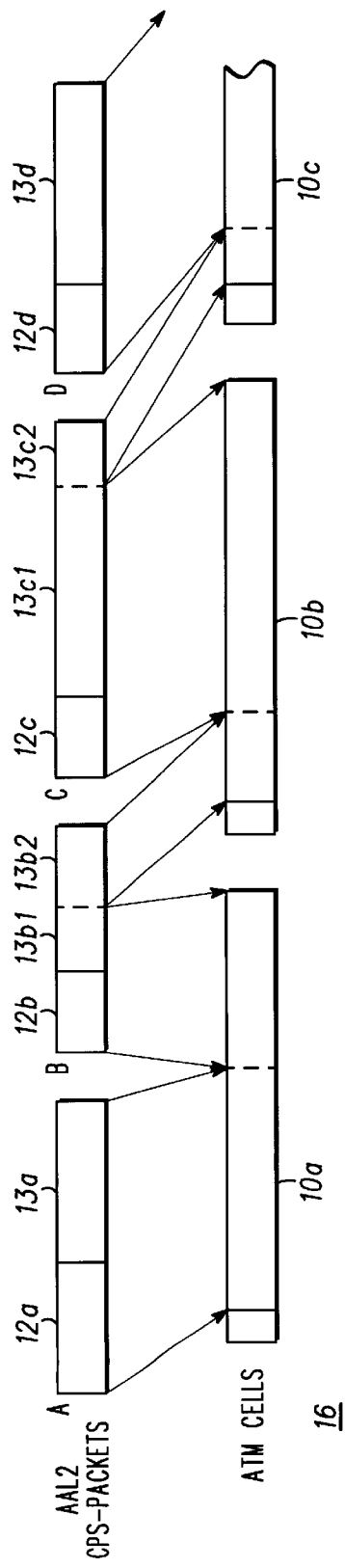
FIG. 3
—PRIOR ART—
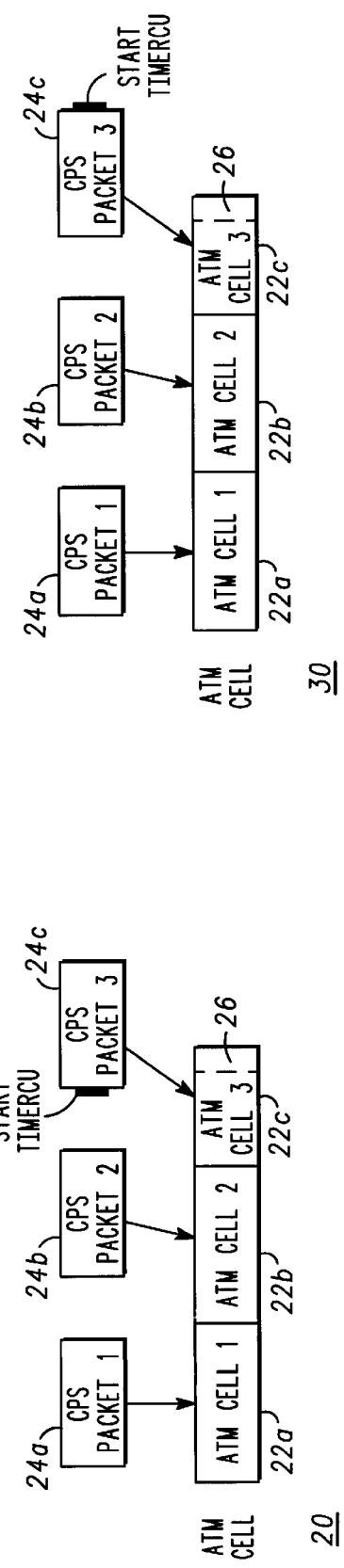
FIG. 4
FIG. 5

METHOD AND CIRCUIT FOR FORMING AN ATM CELL

BACKGROUND OF THE INVENTION

The present invention relates to network communications and, more particularly, to a method and circuit for forming asynchronous transfer method (ATM) cells from Common Parts Sublayer (CPS) packets according to the ATM Adaptive Layer 2 (AAL2) protocol.

ATM is a standard for broadband ISDN in network communications systems. ATM systems have been implemented world-wide in many networks including both private and public environments. ATM is used extensively by most public service providers today to integrate all different types of traffic into one network.

The basic idea of ATM is to segment data in small cells and then transfer these small cells by the use of cell-switching. Such cells have a uniform layout and a fixed size of 53 bytes, which greatly simplifies switching. Referring to FIG. 2(b), an ATM cell 10 is shown. The ATM cell 10 has a 5 byte header (administrative information) and 48 bytes of payload (data). The 48 bytes of payload may optionally contain a 1 byte control field and 47 bytes of actual data, or all 48 bytes may be data.

The ATM Adaption layers (AAL) are service-dependent sublayers of the data link layer. The AAL accepts data from different applications and presents it to the ATM layer as the 48-byte ATM payload segments. AAL2 is one of four types of ATM adaptive layer protocols recommended by CCITT, the others being AAL1, AAL3/4 and AAL5.

AALs differ on the basis of the source-destination timing used, whether they use constant bit rate (CBR) or variable bit rate (VBR), and whether they are used for connection-oriented or connectionless mode data transfer. AAL1 supports connection-oriented services that require constant bit rates and have specific timing and delay requirements. Typically this translates to uncompressed digitized voice or video, which consists of a constant stream of data. AAL2 is used for connection-oriented services that do not require constant bit rates, but which have timing and delay requirements. It is targeted to compressed video or sound. AAL2 transfers information at a variable bit rate. AAL3/4 is intended for both connectionless and connection-oriented links with variable bit rates. AAL3/4 was originally two separate adaption layers, but have since been merged into a single AAL. AAL3/4 is primarily used for the transmission of SMDS packets over ATM networks. AAL5 supports connection-oriented services that require variable bit rates, such as computer communications, which are characterized by short bursts of data transfer in which delay and timing are not crucial. AAL5 is the least complex of the current AAL recommendations. It offers low bandwidth overhead and simpler processing requirements in exchange for reduced bandwidth capacity and error-recovery capability. AAL5 can be implemented in silicon.

Links from WCDMA access networks and core GSM networks use the AAL2 transmission protocol. The AAL2 protocol is used for transmissions between radio base stations and mobile switching centers by the base station controllers. AAL2 permits a great number of data packets to be transmitted efficiently with little delay. Thus, data are transmitted only when the user is in an active session. This highly efficient way of handling data packets can increase the capacity of a standard E1/T1 line to approximately 300 voice calls, compared to about 30 voice calls with today's networks.

Referring to FIG. 2(a), an AAL2 CPS packet 12 is shown. The CPS packet 12 has a three (3) byte header and a CPS-INFO field or payload 13 that can vary in length from one (1) to sixty-four (64) bytes. That is, the CPS packet 12 has a variable length. FIG. 1 shows a portion of the layered protocol stack 14, where layer 1 is the physical layer. In layer 2, the AAL2 operation 16 is shown encircled by the broken chain line.

Referring now to FIG. 3, the AAL2 operation 16 is shown in greater detail. In the AAL2 operation 16, ATM cells 10a–10c are formed from CPS packets 12a–12d. During the cell assembly process, if the size of a CPS packet 12 is larger than the remaining bytes of a partially filled ATM cell 10, than the CPS packet 12 is fragmented to fill the available bytes. For example, CPS packet 12a does not fill ATM cell 10a. However, CPS packet 12b is too large to fit into the remaining portion of ATM cell 10a. Accordingly, the payload of the CPS packet 12b is split into two parts, 13b1, 13b2, with the first part 13b1 filling the first ATM cell 10a and the second part 13b2 forming part of the next ATM cell 10b. Similarly, CPS packet 12c is too large to fit into ATM cell 10a, so the payload of CPS packet 12c is split into two parts 13c1, 13c2, with the first part 13c1 filling the remaining portion of ATM cell 10b and the second part 13c2 being used to form ATM cell 10c.

In the International Telecommunications Union (ITU) specification I.363.2 of AAL2, there is a timer mechanism called TimerCU that is used for avoiding excessive transmission delay for delay sensitive data, such as voice data. According to the ITU specification, the TimerCU is to be started every time a new CPS packet 12 is packed into an ATM cell 10. Thus, referring again to FIG. 3, at point A the TimerCU is started and at points B, C and D, the TimerCU is restarted. If the TimerCU times out before the current ATM cell is filled, the AAL2 protocol specifies that the remaining space in the ATM cell 10 is to be padded with zero and then the ATM cell 10 is to be sent to the physical interface (layer1). Since the length of the CPS packet payload 13 is bounded by 64 bytes, the TimerCU is activated at least every 64 bytes of data. Without specific hardware assistance, such a frequent timer triggering degrades processor performance. However, providing a hardware timer for each AAL2 channel is expensive. Further, providing a software timer for each AAL2 channel is a performance burden on the processor.

SUMMARY OF THE INVENTION

In order to provide more efficient processing operation, the present invention provides a method of generating ATM cells from CPS packets, including the steps of forming the ATM cells by packing the ATM cells with the CPS packets and triggering a TimerCU only when there is one CPS packet remaining to be packed.

The present invention further provides a method of forming an ATM cell from at least one CPS packet, comprising packing the ATM cell with at least a part of the at least one CPS packet, wherein a TimerCU is not triggered unless the at least one CPS packet is a last available CPS packet.

The present invention also provides a method of forming an ATM cell having a fixed length from at least one CPS packet, comprising the steps of placing a header at a beginning of the ATM cell, packing the ATM cell with at least a part of a payload of the at least one CPS packet, wherein a TimerCU is not triggered unless the at least one CPS packet is a last available CPS packet and padding the ATM cell if the ATM cell is not filled by the payload of the CPS packet.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments that are presently preferred. It should be understood, however, that the invention is not limited to the precise arrangements and instrumentalities shown. In the drawings:

FIG. 3 illustrates a stream of AAL2 CPS packets and the formation of corresponding ATM cells;

FIG. 4 illustrates the formation of an ATM cell from AAL2 CPS packets in accordance with a first embodiment of the present invention;

FIG. 5 illustrates the formation of an ATM cell from AAL2 CPS packets in accordance with a second embodiment of the present invention;

DETAILED DESCRIPTION OF PREFERRED EMBODIMENTS

Figure 1:
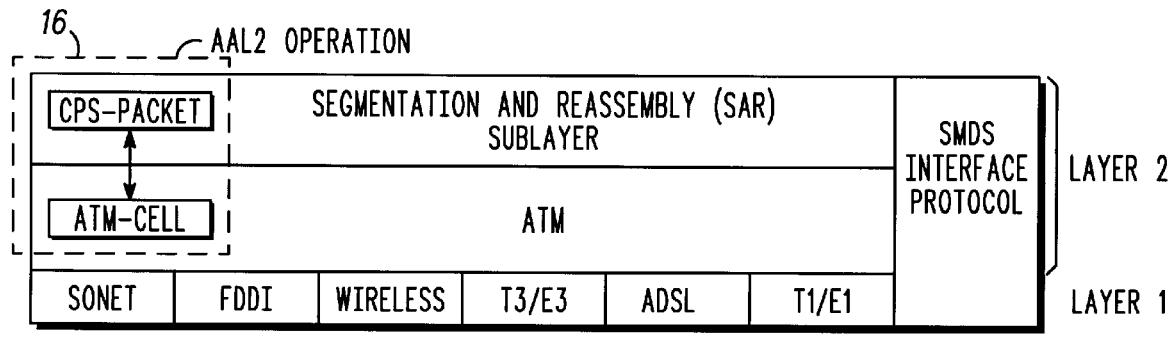
FIG. 1 illustrates layer1 and layer2 of the Opens Systems Interconnect (OSI) protocol.
Figure 2A:
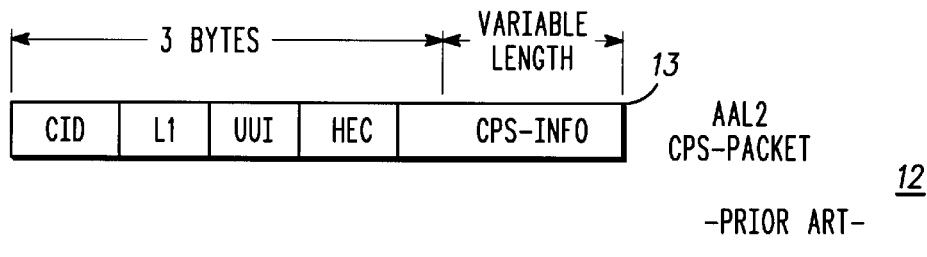
FIG. 2(a) illustrates an AAL2 CPS packet.
Figure 2B:
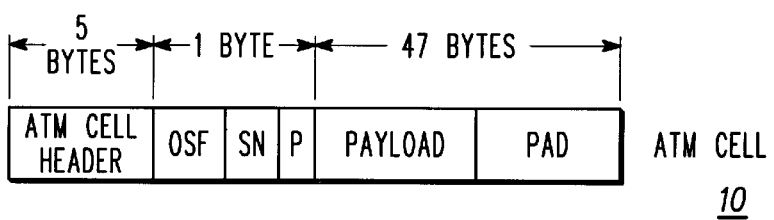
FIG. 2(b) illustrates an ATM cell.

In the drawings, like numerals are used to indicate like elements throughout.

The present invention is directed to a method of generating or forming ATM cells from CPS packets in an ATM AAL2 switching network. As previously discussed with reference to FIG. 3, the ITU specification I.363.2 specifies that the TimerCU for avoiding excessive transmission delay be started every time a new CPS packet is packed into an ATM cell. However, according to the present invention, instead of starting the TimerCU every time an CPS packet is packed, the TimerCU is triggered only when the last available CPS packet is packed. The present invention significantly decreases the number of times the TimerCU is triggered, but does not affect the purpose of the TimerCU, which is to prevent transmission delay of delay sensitive data. The TimerCU expiration is a few milliseconds, while the packing time for each CPS packet is only a few microseconds. Therefore, there is no practical adverse consequence if the TimerCU is triggered before or after a CPS packet is packed. Further, as long as there is a continuous stream of CPS packets waiting to be packed, the TimerCU will not time out or expire before a corresponding packet is packed. Thus, the TimerCU need only be started when a last CPS packet to be processed is either detected or packed. Thus, according to the present invention, the TimerCU need only be triggered when the current ATM cell is partially full and there is no CPS packet waiting to be packed.

Referring now to FIG. 4, a first example 20 of a method of generating ATM cells 22a–22c from CPS packets 24a–24c is shown. The CPS packets 22a–22c have a variable length and the ATM cells are a fixed length of for example, fifty-three (53) bytes. The CPS packets 24a–24c are used to form the ATM cells 22a–22c. Although in this example, the first two CPS packets 24a, 24b form two ATM cells 22a, 22b, it is understood that the CPS packets could straddle borders of the ATM cells and thus, form more or less than two ATM cells. That is, during the cell assembly process, if the size of a CPS packet is larger than the available bytes of an ATM cell, than the CPS packet is fragmented to fill the available bytes and any remaining CPS packet bytes are packed into a next ATM cell. At any rate, the ATM cells 22a–22c are formed by generating an ATM cell header at the beginning of each ATM cell and then packing the ATM cells 22a–22c with the payload of the CPS packets 24a–24c. In the example, the third CPS packet 24c is the last available CPS packet. Further, the third ATM cell 22c is not entirely filled by the payload of the third CPS packet 24c. That is, there is remaining space in the ATM cell 22c. The remaining space is denoted as 26. According to the present invention, a TimerCU is triggered only when there is one CPS packet remaining to be packed. Thus, as shown in FIG. 4, the TimerCU is triggered when the last remaining CPS packet 24c is detected.

According to the present invention, the TimerCU can be triggered either before the last remaining CPS packet 24c has been packed into the last ATM cell 22c or, as shown in FIG. 5, the TimerCU can be triggered after the one remaining CPS packet 24c has been packed into the ATM cell 22c. FIG. 5 shows a second example 30 of a method of generating ATM cells 22a–22c from CPS packets 24a–24c.

Referring to both FIG. 4 and FIG. 5, the last ATM cell 22c has not been completely filled by the payload of the last CPS packet 24c and thus there is extra space 26 in the last ATM cell 22c. According to the present invention, the extra space 26 is padded or zero filled.

Figure 6:
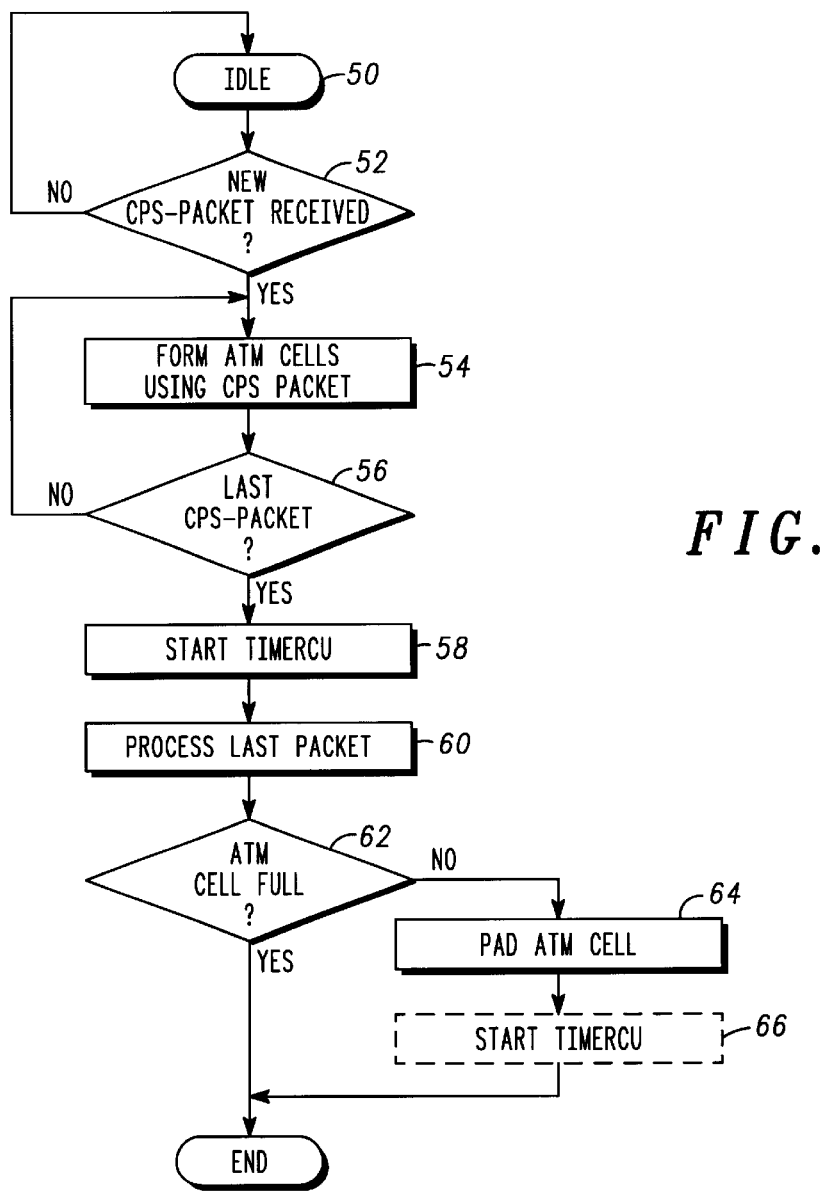
FIG. 6 is a flowchart of a method of forming ATM cells from AAL2 CPS packets in accordance with the present invention.

Referring now to FIG. 6, a flowchart illustrating the method of the present invention is shown. The method may be performed by a circuit or processor 70 (FIG. 7) in a switching network, such as a cellular telephone network. The circuit 70 is initially in an idle loop 50 and upon receipt of a signal or interrupt at step 52 indicating the arrival of CPS packets, the circuit 70 begins processing the CPS packets at step 54. At step 54, the circuit 70 reads the CPS packets and forms ATM cells using the CPS packet payload. The ATM cells are formed by concatenating the CPS packet payload to an ATM header, as is understood by those of ordinary skill in the art. However, rather than triggering a TimerCU at the beginning of processing of each new CPS packet, the CPS packets are continually processed until in step 56 a last CPS packet is detected. AT this time, the TimerCU is triggered in step 58 and then the last CPS packet is processed in step 60. Alternatively, the last CPS packet may be processed before the TimerCU is triggered, as discussed with reference to FIG. 5.

After the last CPS packet has been processed, the circuit 70 determines whether or not the last ATM cell formed has been filled in step 62. If the ATM cell has been filled and there is no empty space, then the routine is finished. However, if the last ATM cell being formed has not been filled, as determined at step 62, then the ATM cell is padded or zero filled at step 64. At this point, if the TimerCU was started in step 58, then the routine is finished. However, as an alternative to starting the TimerCU in step 58, triggering of the TimerCU is preferably predicated upon the conditions that the last CPS packet has been detected (step 56) and the last ATM cell being formed is not filled by the payload of the last CPS packet (step 62), in which case the TimerCU is triggered at step 66, as opposed to being triggered at step 58. As will be understood by those of skill in the art, the exact time that the TimerCU is triggered, but the fact that the TimerCU is not triggered for every CPS packet.

The present invention may be implemented in software, without requiring any special hardware. For example, the present invention may be implemented in microcode of a processor, such as a Motorola MPC8xx processor. However, it will be understood by those of skill in the art that the invention may be practiced using a combination of software and hardware.

Figure 7:
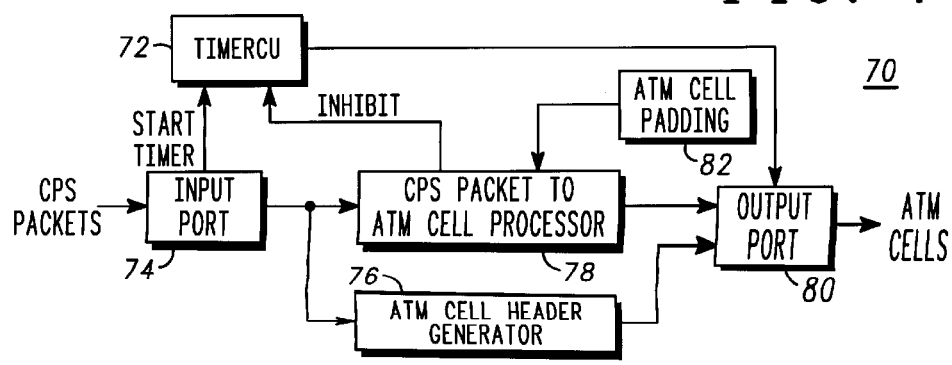
FIG. 7 is a schematic block diagram of a circuit for forming ATM cells from CPS packets.

Referring now to FIG. 7, one embodiment of a processor or circuit 70 capable of performing the aforedescribed method is shown. The circuit 70 includes a TimerCU circuit 72 for measuring a predetermined length of time in order to prevent delays in the transmission of time sensitive data. The TimerCU 72 is a counter that generates a signal or an interrupt signal upon completion of counting to a predetermined value that causes the circuit 70 to output an ATM cell, as is well known by those of skill in the art.

The TimerCU 72 is connected to an input port 74 that receives AAL2 CPS packets. The input port 74 is connected to an ATM cell header generator 76. The header generator 76 receives at least a portion of the CPS packet from the input port 74 and generates an ATM cell header in a manner understood by those of skill in the art. A CPS packet to ATM cell processor 78 is also connected to the input port 74. The CPS packet to ATM cell processor 78 receives the payload of the CPS packet from the input port 74 and uses the payload to form an ATM cell payload.

The header generator 76 and the CPS packet to ATM cell processor 78 are both connected to an output port 80. The ATM cell header generated by the header generator 76 and the ATM cell payload generated by the CPS packet to ATM cell processor 78 are combined at the output port 80 and form an ATM cell, with the ATM cell header being placed at a beginning of the ATM cell.

A padding circuit 82 is connected to the CPS packet to ATM cell processor 78 and provides zeros to the CPS packet to ATM cell processor 78 that are used to fill an ATM cell if the payload of the CPS packet is not large enough to fill the ATM cell and there are no more CPS packets waiting to be processed.

When the input port 74 has no more CPS packets for processing, the input port 74 provides an indication signal to the TimerCU 72 to begin counting. However, the TimerCU 72 may be inhibited from counting by an inhibit signal from the CPS packet to ATM cell processor 78. The inhibit signal is generated if the last ATM cell being formed is filled by the CPS packet payload, in which case the ATM cell is provided to the output port 80. The inhibit signal may be generated by a separate circuit connected to the CPS packet to ATM cell processor 78.

As is apparent, the present invention significantly decreases the number of times the TimerCU is triggered, but does not affect the purpose of the TimerCU, which is to prevent transmission delay of delay sensitive data. Accordingly, the load on the processor is decreased.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of generating ATM cells from CPS (Common Parts Sublayer) packets, comprising the steps of:
    forming the ATM cells by packing the ATM cells with the CPS packets; and
    triggering a TimerCU only when there is one CPS packet remaining to be packed.

2. The method of claim 1, wherein the TimerCU is triggered only after the one remaining CPS packet has been packed into the ATM cell and the ATM cell is not filled by a payload of the one remaining CPS packet.

3. The method of claim 1, wherein the TimerCU is triggered after the one remaining CPS packet has been packed into the ATM cell.

4. The method of claim 1, wherein the TimerCU is triggered prior to the one remaining CPS packet being packed into the ATM cell.

5. The method of claim 1, wherein the ATM cells have a fixed length.

6. The method of claim 1, wherein if the ATM cell is not full, the method further comprising the step of padding the ATM cell from the end of the last CPS packet packed into the ATM cell to the end of the ATM cell.

7. The method of claim 1, wherein the forming step includes placing a header at the beginning of each of the ATM cells.

8. A method of forming ATM cells having a fixed length from CPS packets, comprising the steps of:
    placing a header at a beginning of each ATM cell;
    packing each ATM cell with at least a part of a payload of a CPS packet; and
    padding each ATM cell if the ATM cell is not filled by the payload of the CPS packet, wherein a TimerCU is not triggered unless the CPS packet is a last available CPS packet and the ATM cell is not filled by the payload of the CPS packet.

9. A circuit for forming ATM cells having a fixed length from CPS packets, the circuit comprising:
    a TimerCU circuit for measuring a predetermined length of time;
    means for generating an ATM cell header and placing the header at the beginning of each ATM cell;
    means for packing each ATM cell with at least a part of a payload of a CPS packet;
    means for initiating the TimerCU circuit when the CPS packet is a last available CPS packet; and
    means for inhibiting the TimerCU circuit when the CPS packet is not the last available CPS packet.

10. The circuit of claim 9, further comprising:
    second means for inhibiting the TimerCU circuit when the last available CPS packet payload fills the ATM cell.

* * * * *